(No Model.)
C. S. BRADLEY.
ELECTRIC TRANSFORMER.
No. 525,689.  Patented Sept. 11, 1894.
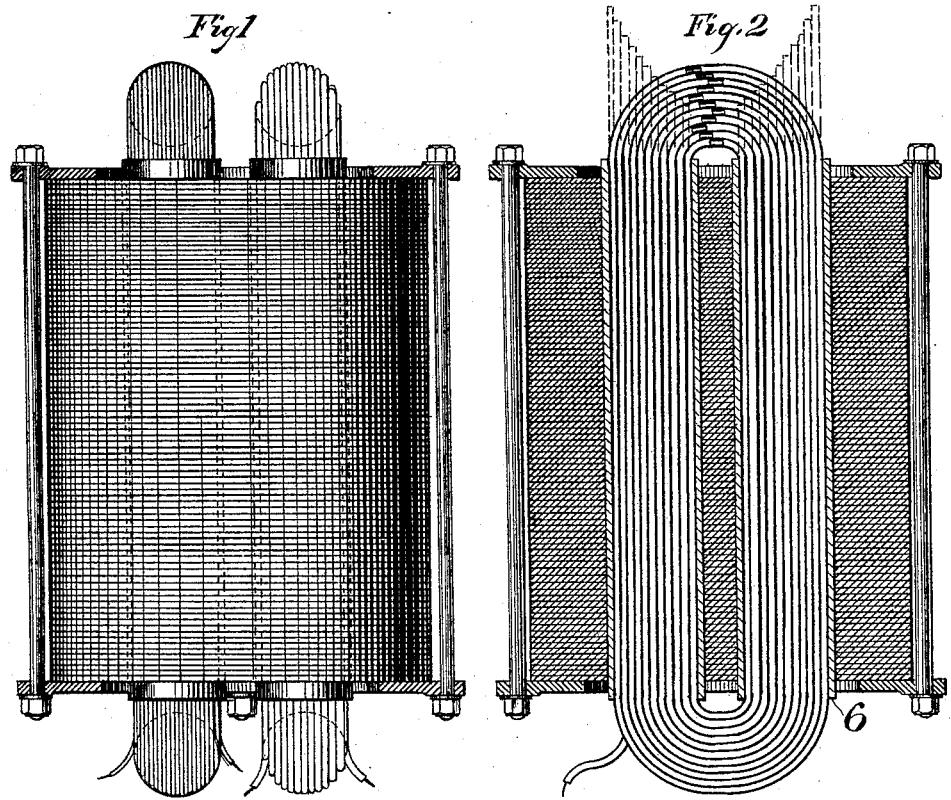
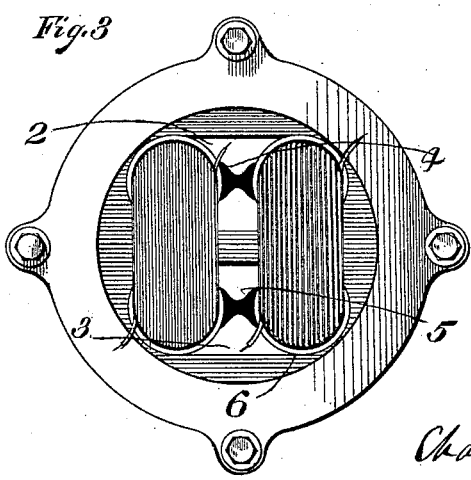

UNITED STATES PATENT OFFICE.

CHARLES S. BRADLEY, OF AVON, NEW YORK.

ELECTRIC TRANSFORMER.

SPECIFICATION forming part of Letters Patent No. 525,689, dated September 11, 1894.

Application filed August 22, 1891. Serial No. 403,496. (No model.)

*To all whom it may concern:*

Be it known that I, CHARLES S. BRADLEY, a citizen of the United States, residing at Avon, in the county of Livingston and State of New York, have invented certain new and useful Improvements in Electric Transformers; and I do hereby declare the following to be a full, clear, and exact description of the invention, such as will enable others skilled in the art to which it appertains to make and use the same.

In commercial transformers the magnetic circuit is formed by building up to the height of the transformer laminated sheets of iron having their centers punched out. It is so difficult to thread the wires of the primary and secondary coils through the central openings, that the plates are cut through the side so that they can be sprung over the wound coils. The break in the magnetic circuit thus made largely increases the magnetic resistance of the coil, and it is desirable to find some method by which the coils may be wound without necessitating a rupture of the magnetic circuit. It is the principal object of my invention to accomplish this end.

The features of novelty will be hereinafter more fully described and will be definitely indicated in the claims appended to this specification.

In the accompanying drawings which illustrate the invention, Figure 1 is a side elevation of a transformer constructed in accordance with my invention. Fig. 2 is a transverse vertical section of Fig. 1 through the primary coil, the coil being shown in elevation. Fig. 3 is a plan of Fig. 1.

The magnetic circuit of the transformer is composed of a series of superposed laminæ of iron, each plate being preferably punched with two slots for the coils, as indicated at 2, 3. The plates are so assembled that the slots register with each other, thus providing two openings through which the primary and secondary wires may be threaded. The tubular openings are lined with insulating tubes 6. They may, if desired, be inserted at the start so as to act as guides in assembling the laminæ. They are preferably formed of glass, and are allowed to project a short distance beyond the laminated core, so as to thoroughly insulate the conductor from contact with the iron of the transformer. They are held in position against the end walls of the slots by insulating spacing strips 4, 5. The laminated plates are fixed in position by end plates and tie bolts, as indicated. When the core has been completed a bundle of wires to constitute the primary or secondary coil is bent and its two ends are thrust through one pair of tubes; the wires being of a length which will permit the projecting ends to be bent into contact, as indicated in dotted lines, Fig. 2. The projecting ends are then united, preferably by electric welding, so that the entire bundle of wires will form a complete coil. To accomplish this end the several wires forming the bundle may be provided with tags or otherwise suitably numbered so that they may be conveniently united in the proper order to constitute a complete coil for the primary and secondary circuits respectively. The welded joints should be wrapped with tape or other insulating material, so as to prevent short-circuiting. Two terminals are left for each coil and may be carried to binding posts, or otherwise arranged for convenient connection into supply and distribution circuits. It will be seen from this structure that a magnetic circuit of complete metallic integrity throughout is provided for each coil, so that the lines of force developed by the current in the primary coil will meet with the least possible resistance, and will therefore exert a maximum effect of conversion.

Having thus described my invention, what I claim as new, and desire to secure by Letters Patent, is—

1. A transformer composed of a series of superposed laminæ of iron provided with two openings for the coils with an intervening web of iron, the wires constituting the primary and secondary coils being threaded through the openings and united at the ends so as to form a continuous circuit.

2. A transformer comprising a core of superposed iron disks having axial openings, insulating tubes projecting through the openings, and primary and secondary windings threaded through the tubes, bent around the projecting ends and united so as to form continuous primary and secondary circuits.

In testimony whereof I affix my signature in presence of two witnesses.

CHARLES S. BRADLEY.

Witnesses:
WM. J. LENNART,
C. J. MCLAIN.